Figure 2:
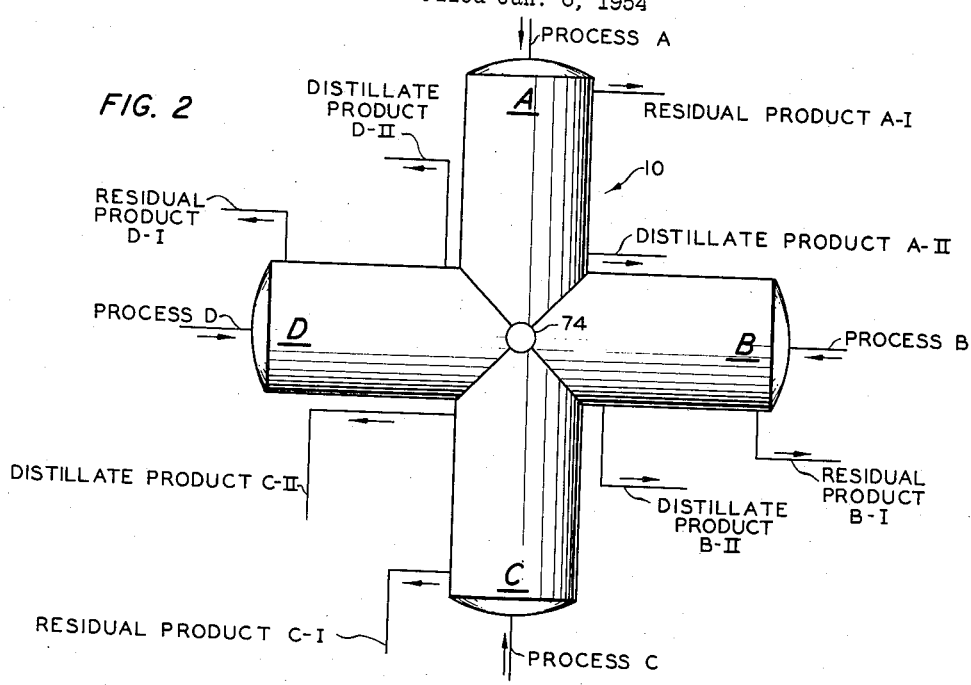

Dec. 23, 1958

C. H. OWEN 2,865,835

FLASH DISTILLATION PROCESS

Filed Jan. 6, 1954

INVENTOR.
CHARLEY H. OWEN

BY Hudson and Young
ATTORNEYS

United States Patent Office 2,865,835
Patented Dec. 23, 1958

2,865,835

FLASH DISTILLATION PROCESS

Charley H. Owen, Phillips, Tex., assignor to Phillips Petroleum Company, a corporation of Delaware Application January 6, 1954, Serial No. 402,578

6 Claims. (Cl. 208—40)

This invention relates to the vacuum distillation of distillable materials. In one aspect this invention relates to apparatus in which at least three separate distillation charge stocks can be separately vacuum distilled. In another aspect this invention relates to a process for effecting vacuum distillation of at least three separate distillation charge stocks, in a single distillation zone. In another aspect this invention relates to the manufacture of hydrocarbons in accordance with a novel combination of process steps comprising vacuum distillation, vis-breaking, and/or recycle cracking. In still another aspect this invention relates to process and apparatus for effecting vacuum reduction of at least three separate hydrocarbon feed stocks followed by further treatment of reduction products by vis-breaking and/or recycle cracking, to produce virgin gas oil and aromatic gas oil fractions and high softening point residual pitch products. In still another aspect this invention relates to the conversion of heavy residual hydrocarbon oils to virgin gas oils and synthetic aromatic gas oil fractions. In still another aspect this invention relates to the manufacture of hydrocarbons.

In the co-pending applications, Serial No. 241,183, filed August 10, 1951, and Serial No. 400,450, filed December 28, 1953, now abandoned of Paul M. Waddill; Serial No. 400,526, filed December 28, 1953 of Paul M. Waddill and William E. Barr; and Serial No. 327,890, filed December 24, 1952, now Patent No. 2,760,918, of William E. Barr are disclosed apparatus and process for effecting separate vacuum distillation of two separate distillable materials in the same distillation vessel. Such type operation is advantageous from the standpoint of utilization of a single vacuum source, and is economically desirable from the standpoint of conservation of construction materials, e. g., steel and insulation material, and conservation of heat. However, the art has not been provided heretofore with a single distillation vessel and/or distillation process wherein more than two separate feed stocks can be separately vacuum distilled in a single vessel, such apparatus and process being advantageous to a markedly increased extent over operations involving vacuum distillation of only two separate stocks in the same vessel, i. e., from the standpoint of conservation in construction materials, heat requirements, and vacuum producing requirements.

In accordance with my invention, I have provided a process comprising introducing at least three separate streams of distillable materials into separate sections in a distillation zone, under flashing conditions, to vaporize a portion of each of said steams; separating and isolating in said zone, vapors from each of said flashings and therein condensing isolated portions of vapors to form separate condensates; and recovering separate residuum and condensate fractions thus formed in said distillation zone as products of the process.

Also, in accordance with my invention, I have provided a vessel comprising at least three substantially horizontal drums, each said drum having a closed end and an open end and joined with the other at its open end; vacuum producing means in communication with the interior of said vessel; conduit means for admitting fluid into and removing fluid from said vessel; and dam means in said vessel for preventing flow of liquid from one of said drums into another.

My invention, in accordance with another concept, provides a novel combination of steps for treating hydrocarbons, wherein at least three separate hydrocarbon feed stocks are separately vacuum distilled in a single vacuum distillation vessel, at least one of which feed stocks is a product of recycle cracking of a separate residuum product of said distillation and at least one of which said feed stocks is a product of vis-breaking of a separate residuum product of said distillation, whereby selected pitch and gas oil fractions are recovered as products.

Figure 1:
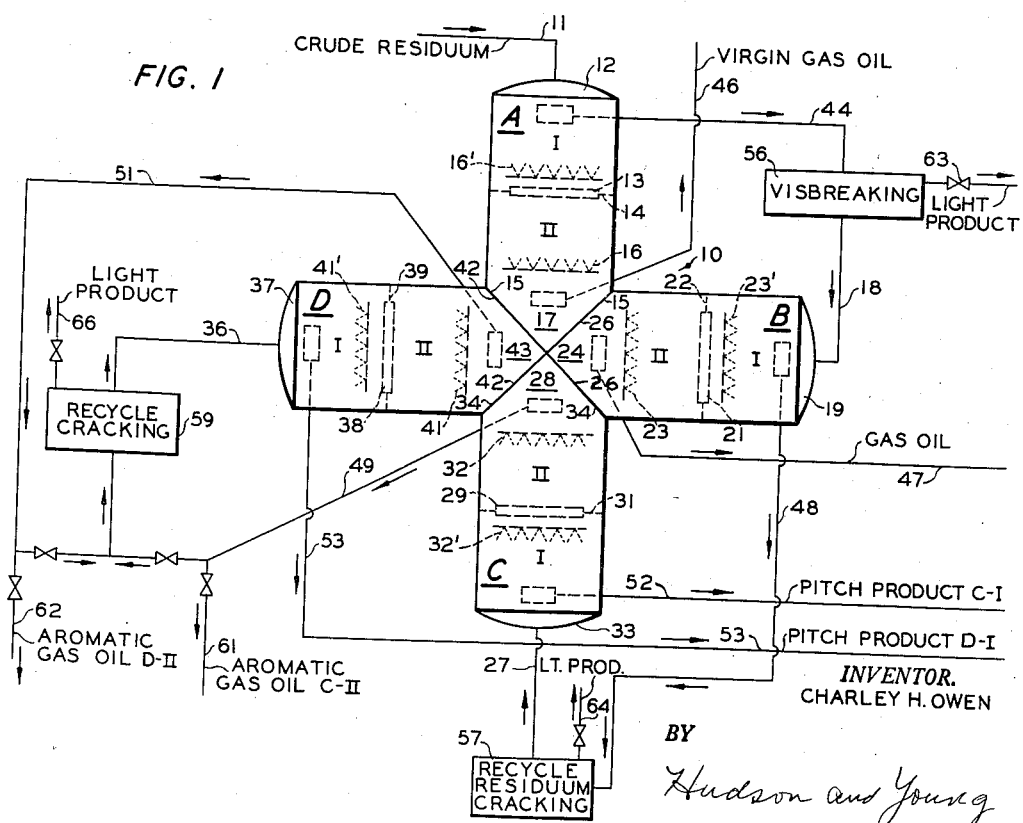

My invention is further illustrated with reference to the drawings. Figure 1 is a diagrammatic plan view of one embodiment of distillation apparatus of this invention, embodying a top view of four substantially horizontal drums joined together at open ends thereof; and is illustrative of process of this invention embodying separate distillation of at least three separate stocks of distillable materials in a single vessel. Figure 2 is a diagrammatic illustration of products that are obtained in accordance with the process of this invention, four connected drums being shown in top view.

Referring to Figure 1, vessel 10 comprises four sections, A, B, C and D, each said section constituting a substantially horizontal drum, having a closed end and an open end and the said sections being joined with each other at their open ends. In each section is provided feed inlet means and, when desired, baffle and/or spray means for facilitating condensation and separation of unvaporized liquid from condensate in each drum; internal dam means being provided in a central portion of vessel 10 to form four separate compartments in vessel 10 for collection of separate distillate product formed in each of the sections, A, B, C and D. Thus, in vessel 10, feed inlet conduit 11 extends into substantially horizontal drum section A, preferably through closed end 12 thereof. Baffle means 13, disposed in, and with ring support and dam element 14, transversely closes section A. Spray nozzle assembly means 16 is disposed intermediate baffle 13 and the open end 17 of section A, and is adapted to direct spray in a direction toward baffle 13. Baffle 13 and/or spray means 16 can be dispensed with when desired, it being only essential that adequate heat transfer means be present for effecting the desired condensation. Internal dam 15 is disposed along a bottom portion of drum A intermediate spray assembly 16 and open end 17, preferably in close proximity to open end 17, and in one preferred form defining the boundary of end portion 17. Feed conduit 18 extends into drum B, preferably through closed end 19. Baffle 21, disposed in and with ring support and dam element 22, transversely closes section B. Spray nozzle assembly 23 is disposed intermediate baffle 21 and open end 24 of drum section B, and is adapted to direct spray in a direction toward baffle 21. Internal dam 26 is disposed along a bottom portion of drum section B intermediate spray assembly 23 and open end 24 thereof, preferably in close proximity to open end 24, and in one embodiment defining the boundary of end portion 24.

The inlet conduit 27 extends into drum C, preferably through closed end 33. Baffle 29, disposed in and with support ring and dam element 31, transversely closes drum C. Spray nozzle assembly 32 is disposed intermediate baffle 29 and open end 28 of drum C and is adapted to direct spray in a direction toward baffle 29. Internal dam 34 is disposed along the bottom portion of drum C intermediate spray assembly 32 and open end 28 of drum C, preferably in close proximity to open end 28 and in one embodiment defining the boundary of open end 28.

Feed conduit 36 extends into drum D, preferably through closed end 37. Baffle section 38, disposed in and with support ring and dam element 39, transversely closes drum D. Spray nozzle assembly 41 is disposed intermediate baffle 38 and open end 43 of drum D and is adapted to direct spray in a direction toward baffle 38. Internal dam 42 is disposed along a bottom portion of drum D, intermediate spray nozzle assembly 41 and open end 43, preferably in close proximity to open end 43 and in one embodiment defining the boundary of open end 43.

Conduit 74 (Figure 2) is connected with vessel 10 so as to be in direct communication with the interior thereof at a central point, i. e., central relative to drums A, B, C, and D, being advantageously in close proximity to a point above intersection of internal dams 15, 26, 34 and 42.

In the operation of one embodiment of my process with reference to Figure 1, a heavy oil feed such as a crude residuum via line 11, is charged into section A–I of vessel 10 under flashing conditions therein, to vaporize a portion of feed. Vapors containing entrained droplets of unvaporized liquid are passed through baffle section 13, the latter causing vapors to pass therethrough along a tortuous path so as to cause separation of entrained droplets therefrom by centrifugal force, baffle 13 thus functioning to deflect droplets from vapors passed therethrough. Unvaporized liquid, including droplets deflected from vapors passed through baffle 13, is collected as a residual pitch product fraction in section A–I and is removed via line 44. Vapors from section A–I passed through baffle 13 into section A–II, are condensed therein by any desired cooling means, preferably in heat exchange relation with a spray of cool liquid condensate from section A–II, passed into nozzle assembly 16, by way of lines not shown. Spray emitted from nozzle assembly 16 is advantageously discharged under momentum conditions such that sprayed droplets contact resulting condensate and droplets under conditions causing sprayed droplets and condensate to collect, i. e. to settle, in section A–II. Resulting condensate, settled in section A–II, is prevented from flowing out of section A–II into drums B, C, or D, by dam means 15. Liquid condensate is recovered from section A–II via line 46.

A second heavy oil feed, which can be the same or different from that charged to drum A–I, is introduced into section I of drum B via line 18 therein to vaporize a portion of the feed. Vapors containing entrainment are passed from section I of drum B into section II through baffle 21, similar in design to baffle 13, to deflect entrained droplets from the said vapors, which are then contacted in drum section C–II with cool spray from nozzle assembly 23 to substantially completely condense those vapors. Condensate from section II of drum B is removed in part as product via line 47 and the remaining part is returned as feed to nozzle 23. Residuum product is removed from section I of drum B via line 48. A third feed stock is introduced into section I of drum C via line 27 under flashing conditions in drum C to vaporize a portion of the feed and to cause removal of entrainment from resulting vapors and then to cause condensation of the latter in conjunction with baffle 29 and spray system 32, in the same manner as described in the operations associated with drums A and B.

A fourth feed stock is introduced into section D–I of vessel 10 via line 36 under flashing conditions in drum D to vaporize a portion of the feed and to cause removal of entrainment from resulting vapors followed by condensation of the said vapors, in conjunction with baffle 38 and spray system 41, in the same manner as described relative to operation of sections A and B. Condensate is removed from section II of drum C via line 49, and from section II of drum D, via line 51. Residuum product is withdrawn from section I of drum C via line 52, and from section I of drum D via line 53.

Illustration of the above discussed embodiment, relative to the introduction of at least three charge stocks and withdrawal of distillation products from the single vessel, is further illustrated with reference to Figure 2.

In accordance with one embodiment of this invention, and with further reference to Figure 1, a crude residuum is vacuum reduced in section A–I. Residuum product in section A–I is removed from vessel 10 and charged to a mild cracking or vis-breaking step, the latter type operation being conducted in accordance with conditions well known in the art, such as for example at a temperature within the limits of 870 to 960° F. and at a pressure within the range of 150 to 250 p. s. i. a. Residual visbreaking product is then charged as feed to section I of drum B and vacuum reduced therein. Residuum product from section B–I is then charged to a recycle residuum cracking step, such operation constituting a relatively severe cracking, such as is effected at a temperature within the range of 920 to 1020° F. and at a pressure within the range of 300 to 500 p. s. i. a. Residuum product from recycle cracking is then charged as feed to section C–I of vessel 10 and gas oil distillate in section C–II is charged to conventional recycle cracking of the type above described, from which residuum product is charged as feed to section D–I of vessel 10 for vacuum reduction therein. Gas oil distillate from section D–II can be recycled with distillate from section C–II to the last-said recycle cracking. Products resulting from this combination process include selected gas oil fractions, especially suitable for charging to catalytic cracking, and highly aromatic gas oil fractions, together with residual high-softening-point pitch products. Thus, with specific reference to Figure 1, crude residuum is introduced into section I of drum A of vessel 10 under flashing conditions so as to vaporize a portion of the feed in section A–I. Vapors containing entrained unvaporized liquid droplets are passed through baffle 13 in contact with relatively cool liquid spray emitted from spray nozzle 13 so as to be condensed in section II of drum A. Residuum from section A–I is removed via line 44 and charged to vis-breaking zone 56, wherein it is subjected to mild cracking conditions as discussed hereinabove. Residuum product from vis-breaking is charged as feed to section B–I under flashing conditions therein to partially vaporize the feed. Vapors containing entrained unvaporized liquid droplets are passed through baffle 21 in contact with cool spray emitted from spray nozzle 23 to effect substantially complete condensation in section B–II. Residuum product is removed from section B–I via line 48 and charged to recycle residuum cracking zone 57, wherein it is subjected to cracking under conditions more severe than those employed in zone 56, such as those discussed hereinabove. Residuum product from recycle cracking is removed from zone 57 via line 27 and charged into section C–I under flashing conditions therein to vaporize a portion of the feed. Vapors containing entrained droplets of unvaporized liquid are passed from section C–I through baffle 29 in contact with cold liquid spray emitted from nozzle assembly 32 to effect substantially complete condensation of vapors therein. Condensate product of substantially complete condensation of vapors in each of sections A–II, B–II and C–II is withdrawn from each of the latter sections, respectively, via lines 46, 47, and 49. Condensate in line 49, comprising an aromatic gas oil, is charged to recycle cracking zone 59, wherein it is subjected to cracking conditions similar to those employed in zone 57. Residuum product from cracking in zone 59 is charged to section D–I of vessel 10 under flashing conditions therein to effect partial vaporization of feed. Vapors containing entrained droplets of unvaporized feed are passed from section D–I through baffle section 38 into section D–II in contact in the latter section with relatively cool spray so as to substantially completely condense vapors therein, Condensate is removed from section D–II via line 51 and recycled in part with condensate from line 49, when desired, to cracking zone 59. When desired, aromatic gas oil condensate product can be withdrawn from the system via lines 49 and 61, and aromatic gas oil condensate product from section D–II can be withdrawn from the system via lines 51 and 62. Light products can be withdrawn, respectively, from zones 56, 57 and 59 via lines 63, 64 and 66. Residual high-softening-point pitch products are withdrawn from vessel 10, from section C–I via line 52, and from section D–I via line 53.

In accordance with the immediately foregoing embodiment, a crude residuum has been charged to a distillation vessel of this invention in accordance with the process of this invention, and, in conjunction with auxiliary visbreaking and recycle cracking steps, has been converted into a virgin gas oil distillate, a gas oil distillate containing aromatics and suitable for charge to catalytic cracking, and highly aromatic gas oil distillates together with separate grades of residual pitch product.

When referring herein to the introduction of feed into a distillation zone under flashing conditions, it is meant that the feed is introduced at a sufficiently high vacuum so as to effect the desired flashing. Exemplary of such conditions relative to hydrocarbon oil flashing, are temperatures in range of from 600 to 900° F. and pressures within the range of from 0.4 to 20 mm. Hg, although it is to be understood that temperature and pressure conditions outside these ranges can be employed dependent upon the specific feed stock to be flashed.

When charging feed stock into the system under flashing conditions, it is generally advantageous to discharge the feed in the flash section in a direction opposite to the direction of vapor flow therein, preferably against a liquid coalescing surface, such conditions causing the charge emitted to suddenly change its direction of flow, subsequent to striking the coalescing surface or the end of the vessel. In this manner, separation of unvaporized and vaporized portions of charge is facilitated in the flash section.

Although in illustrating my invention with reference to Figure 1, sprayed droplets are preferably directed toward the baffle in each drum, i. e., against vapor flow, it is to be understood that the said sprayed droplets can be directed in any direction to effect the desired vapor-spray contacting, it being important in any such embodiment that the said vapor-spray contacting be conducted in a manner so as to achieve the desired heat exchange. Thus, emitted droplets from any one or more of nozzle assemblies 16, 23, 32 and 41 of Figure 1 can be directed concurrent with, transverse to, or against the flow of vapors contacted therewith. Thus, spray nozzle structure of this invention is adapted accordingly to emit spray in the direction desired.

It is to be understood that although it is advantageous to employ a baffle section and/or a spray system, as illustrated, neither is required. Any condensing means, such as cooling coils or other heat exchange equipment, can be employed in any one or all condensing sections to effect the desired heat exchange so as to achieve condensation. When dispensing with the use of a baffle or other such liquid droplet deflecting means, vapors to be condensed will generally contain droplets of unvaporized feed as contaminants, which, dependent on the specific feed stock, may be desired. However, even if use of a baffle is dispensed with, substantially complete settling of entrained droplets from vapor to be condensed may be effected dependent on the settling time, such as determined by the length of the drum flash section.

Any suitable design of baffle section, for example baffle 13, can be employed which will cause vapors passed therethrough to follow a tortuous path, whereby entrained droplets are caused to be separated by centrifugal force and can be collected as liquid product in the flash section. Typical of such a baffle that can be employed in vessel 10 of Figure 1, is one comprising a plurality of parallel courses of angle irons, each said course substantially closing said chamber, angle irons in each of these said courses facing a common direction transversely across the chamber, and each angle in each course having its vertex positioned within the sides of the adjacent and preceding angle, the baffle employed, in any case, serving as a liquid droplet deflecting surface, i. e., so as to deflect entrained liquid droplets from vapors passed therethrough.

Specific cooling means have not been specifically shown for effecting the desired cooling of liquid fed to spray systems in the vacuum distillation vessel of Figure 1. However, it is to be understood that any conventional type cooling can be employed such that liquid emitted from the spray assembly is sufficiently cooled to cause vapors contacted in heat exchange relation therewith to condense. When liquid sprays are employed, as described herein, it is important that, in order to prevent condensate droplets from passing into an adjacent drum section, that the momentum of the sprayed liquid be sufficient that upon colliding with vapor and resulting condensate droplets, the coalesced spray and condensate droplets are caused to settle as product in the condensing section. However, these momentum conditions are of secondary importance when the drum section is of sufficient length that there is sufficient time for droplets of condensate and sprayed liquid to settle in the condensing section prior to reaching the end thereof.

Although I have illustrated my invention with reference to the separate vacuum reduction of four separate feed stocks, it is to be understood that my invention is equally well applied to the separate vacuum reduction of three or more separate stocks, which stocks can be the same or different. Also, although I have illustrated distillation apparatus comprising four drum sections at substantially right angles to each other, and of substantially the same cross section, it is to be understood that as many drum sections can be employed as desired and that they can be disposed at any desired angle to each other and can each be of any suitable cross section. Although I have illustrated certain embodiments of my invention with reference to the vacuum distillation of hydrocarbon oil residua, it is to be understood that my invention is not limited to distillation of such materials but is applicable to the distillation of any distillable material, such as for example, vegetable, animal, and mineral oils, distillable organic and inorganic chemical mixtures or solutions, and juices; such as in low-temperature flash distillation of water from fruit and vegetable juices, e. g., in the concentration of orange or other citrus juices by flashing water therefrom.

If desired, a spray nozzle assembly can be disposed in one or more of the flash sections in the apparatus of Figure 1, i. e., sections A–I, B–I, C–I, and D–I, to emit spray in contact with entrainment-containing vapors therein, preferably in flow against such vapors. Such spray nozzle assemblies are indicated as elements 16', 23', 32', and 41'. In the practice of process of this invention employing one or more of spray nozzles 16', 23', 32' and 41', feed to the spray assembly is liquid product in that flash section. Sprayed droplets thus passed in impinging contact with entrainment-containing vapor, preferably against the flow of vapor, are emitted under conditions such that they have a momentum preferably at least as great, and a temperature at least as high as the momentum and temperature, respectively, of entrained droplets in the vapor contacted therewith, so as to cause the emitted droplets and the impinged droplets to settle as liquid in the flash section. Under these conditions substantially no condensation of vapor in the flash section takes place as result of the spray-vapor contact and entrained impinged and sprayed droplets therein are caused to settle in that section for withdrawal from the system, thus providing substantially entrainmentfree vapors for subsequent condensation to form relatively clean condensate.

The use of sprays, as described, in the flash section is optional. They can be used in conjunction with, or in place of the transverse baffle section.

Variations and modifications are possible within the scope of the foregoing disclosure, drawings and the appended claims to the invention, the essence of which is a process for effecting separate vacuum distillations of at least three separate streams of distillable materials in a single distillation vessel, comprising introducing at least three separate streams of such materials into separate sections in a single distillation zone under flashing conditions to vaporize a portion of each said stream; separately separating and isolating in said zone vapors from each of said flashings and therein condensing isolated portions of said vapors to form separate condensates; and recovering separate residuum and condensate fractions thus formed in said zone as product of the process; in accordance with another concept, this invention providing a vessel comprising at least three substantially horizontal drums, each said drum having a closed end and an open end and joined with the other at its open end; vacuum producing means in communication with the interior of said vessel; conduit means for admitting fluid into and removing fluid from said vessel; and dam means in said vessel for preventing flow of liquid from one of said drums into another.

I claim:

1. A process comprising introducing at least four separate streams of distillable materials into separate sections in a distillation zone under flashing conditions to vaporize a portion of each of said streams; separately separating and isolating in said zone vapors from each of said flashings and therein condensing isolated portions of said vapors to form separate condensates; introducing into said distillation zone as a first of said separate streams a reduced virgin petroleum crude to produce a first residuum as flashing product, and subjecting said residuum to vis-breaking; recovering the residuum product from said vis-breaking and introducing same into said distillation zone as a second of said separate streams to form a second residuum as flashing product; subjecting said second residuum to recycle cracking and introducing residuum product from said cracking as a third of said separate streams into said distillation zone; recovering distillate from flashing the said third stream and introducing same into said distillation zone as a fourth of said separate streams; and recovering virgin gas oil, aromatic gas oil, and residual pitch fractions as product.

2. A process comprising introducing a reduced petroleum crude into a first flash section of a distillation zone under flashing conditions to vaporize a portion of same; passing vapor thus formed into a first condensing section in said zone and condensing same therein; subjecting unvaporized liquid from said first flash section to vis-breaking and passing residuum product from said vis-breaking into a second flash section in said distillation zone under flashing conditions to vaporize a portion of same; passing vapors formed in said second flash section into a second condensing section in said zone and condensing same therein; subjecting residuum from said second flash section to recycle cracking and passing residuum product from said cracking into a third flash section of said distillation zone under flashing conditions to vaporize a portion of same; passing vapors formed in said third flash section into a third condensing section in said zone; and condensing same therein; subjecting condensate from said third condensing zone to recycle cracking and passing residuum product from the last said cracking into a fourth flash section in said zone under flashing conditions to vaporize a portion thereof; and recovering as product of the process a virgin gas oil condensate, a residual pitch and an aromatic gas oil condensate.

3. The process of claim 2 wherein a portion of aromatic gas oil condensate formed in said fourth condensing section, is recycled with condensate from said third condensing section, to the last said recycle cracking.

4. The process of claim 2 wherein vapors from at least one of said flash sections are passed through a liquid particle deflecting zone prior to passing same into a condensing zone, and wherein condensate is formed in said condensing zone by contacting vapors therein in heat exchange relation with a liquid spray at a temperature lower than that of said vapor contacted therewith.

5. The process of claim 2 wherein said vis-breaking is effected at a temperature of from 870° to 960° F.; wherein the first said recycle cracking is conducted at 920° to 1020° F.; and wherein the last said recycle cracking is effected at 920° to 1020° F.

6. A process comprising introducing at least three separate streams of distillable materials into separate sections in a distillation zone under flashing conditions to vaporize a portion of each of said streams; separately separating and isolating in said zone vapors from each of said flashings and therein condensing isolated portions of said vapors to form separate condensates; vapors from said flashings containing entrained droplets; recovering unvaporized liquid from at least one of said flashings and emitting same as a spray against flow of entrainment-containing vapors in at least one of said sections; emitted sprayed droplets having a momentum at least as great and a temperature at least as high as the momentum and temperature, respectively, of entrained droplets in vapor contact therewith, whereby impinged entrained droplets in said vapors are caused to settle together with sprayed droplets in the said flash section without effecting condensation of any vapors so contacted; and recovering distillation product thus formed in said distillation zone as product of the process.

References Cited in the file of this patent

UNITED STATES PATENTS

| 1,730,891 | Leslie et al. | Oct. 8, 1928 |
| 1,780,977 | Leslie et al. | Nov. 11, 1930 |
| 2,034,891 | Benz | Mar. 24, 1936 |
| 2,443,970 | Waddill | June 22, 1948 |
| 2,698,282 | Findlay | Dec. 28, 1954 |
| 2,756,186 | Owen et al. | July 24, 1956 |
| 2,760,918 | Barr | Aug. 28, 1956 |
| 2,805,981 | Cavin et al. | Sept. 10, 1957 |

FOREIGN PATENTS

| 605,640 | Germany | Dec. 18, 1930 |
| 699,900 | Germany | Nov. 14, 1940 |

UNITED STATES PATENT OFFICE

CERTIFICATE OF CORRECTION

Patent No. 2,865,835  December 23, 1958

Charley H. Owen

It is hereby certified that error appears in the printed specification of the above numbered patent requiring correction and that the said Letters Patent should read as corrected below.

Column 1, line 39, strike out "now abandoned" and insert the same after "August 10, 1951," in line 38, same column.

Signed and sealed this 26th day of May 1959.

(SEAL)
Attest:

KARL H. AXLINE
Attesting Officer

ROBERT C. WATSON
Commissioner of Patents